United States Patent
Reibling et al.

(10) Patent No.: US 10,343,674 B2
(45) Date of Patent: Jul. 9, 2019

(54) VEHICLES WITH MULTIPLE HIGH VOLTAGE BATTERIES

(71) Applicant: FORD GLOBAL TECHNOLOGIES, LLC, Dearborn, MI (US)

(72) Inventors: Michael E. Reibling, Sterling Heights, MI (US); Hari Krishna Addanki, Novi, MI (US); Raymond C Siciak, Ann Arbor, MI (US); John Sturza, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 125 days.

(21) Appl. No.: 15/796,552

(22) Filed: Oct. 27, 2017

(65) Prior Publication Data
US 2019/0126906 A1 May 2, 2019

(51) Int. Cl.
*B60W 20/14* (2016.01)
*B60W 10/06* (2006.01)
*B60W 10/08* (2006.01)
*B60W 10/26* (2006.01)

(52) U.S. Cl.
CPC ............ *B60W 20/14* (2016.01); *B60W 10/06* (2013.01); *B60W 10/08* (2013.01); *B60W 10/26* (2013.01); *B60W 2510/244* (2013.01); *B60W 2710/0666* (2013.01); *B60W 2710/083* (2013.01)

(58) Field of Classification Search
CPC ...... B60W 20/14; B60W 10/06; B60W 10/08; B60W 10/26; B60W 2510/244; B60W 2710/0666; B60W 2710/083
See application file for complete search history.

(56) References Cited

U.S. PATENT DOCUMENTS

| | | | |
|---|---|---|---|
| 8,471,521 B2 | 6/2013 | Stewart et al. | |
| 2010/0133023 A1* | 6/2010 | Tang | B60L 53/11 180/65.1 |
| 2012/0077633 A1* | 3/2012 | Mueller | B60K 6/365 475/5 |
| 2012/0253547 A1* | 10/2012 | Beacock | G06F 9/44505 701/1 |
| 2013/0241466 A1 | 9/2013 | Mitsuda et al. | |

(Continued)

FOREIGN PATENT DOCUMENTS

CN 205395986 U 7/2016

*Primary Examiner* — Calvin Cheung
(74) *Attorney, Agent, or Firm* — Brooks Kushman P.C (57) ABSTRACT

A hybrid electric vehicle having one or more controllers, at least two axles independently driven by respective electric machines (EMs) that are each coupled to a separate battery, and a combustion engine (CE) coupled to one of the axles. At least one of the controller(s) are configured to deliver power to one of the axles in a single axle drive mode, and in response to a torque demand signal (TDS) exceeding a single axle power limit, to deliver power to another axle, and/or all axles. The controller(s) are further configured to respond to the TDS exceeding a multiple axle power limit, and to deliver additional CE power to the coupled axle. In response to a braking signal, the controller(s) may also adjust at least one of the EMs to capture mechanical braking energy from a respective axle, and generate negative torque to charge one or more of the separate batteries.

20 Claims, 2 Drawing Sheets

(56) References Cited

U.S. PATENT DOCUMENTS

| | | | |
|---|---|---|---|
| 2014/0228167 A1* | 8/2014 | Frank | B60K 6/442 477/5 |
| 2015/0336566 A1* | 11/2015 | Johri | B60W 10/26 701/22 |
| 2018/0009310 A1* | 1/2018 | Storm | B60K 6/52 |

* cited by examiner

VEHICLES WITH MULTIPLE HIGH VOLTAGE BATTERIES

TECHNICAL FIELD

The present disclosure relates generally to systems and methods for control and utilization of independently configured high voltage batteries and drive axles in a hybrid electric vehicle.

BACKGROUND

Electric, plug-in, battery, full, and mild hybrid electric vehicles (HEVs), have a powertrain that includes, among other components, an internal combustion engine (CE), electric machines or motor/generators (EMs), batteries and other energy storage devices, and multiple drive axles that are coupled with one or more controllers, and which include the EMs to each be coupled with a single one of the drive axles. Such batteries may be configured with either high power or high energy capabilities wherein the high power variation enables high power discharge for short times and distances, and the high energy capabilities enables discharge over longer times and distances.

Typically, the high power capabilities are utilized for short duration, short distance high torque demands, and such batteries are rapidly recharged to sustain a maximum capacity, to ensure availability for each high torque demand. In contrast, such high energy batteries enable relatively longer duration discharge over relatively longer distances. Full HEVs (FHEVs) most often include such high power, short duration/distance, low energy batteries operating only in charge sustaining modes, while other types of HEVs, such as plugin HEVs or PHEVs, usually and/or may include the higher energy, longer duration batteries operating in charge depletion modes, which enable utilization over longer distances. Such FHEVs are configured to be utilized in electric only modes of operation for short periods of time, at slow vehicle speeds, and for vehicle accelerations that are lower than that for other types of batteries. However, mild HEV or mHEV batteries are typically configured with lower operating voltages that may range about 48 volts or so, and are typically utilized to power vehicle accessories during vehicle deceleration and stop conditions, and for relatively short periods of time.

In other arrangements for plug-in HEVs (PHEVs), such batteries may be utilized in both charge sustain and depletion modes in response to various torque demands, and have utilization ranges that are typically shorter than that for BEV batteries. In any such configurations, improvements are needed to enable selective recharging of such batteries with regenerative braking energy and other power sources, and selective use of such batteries to power one or more electric machines coupled to respective axles in response to torque power demands and various HEV operational modes.

SUMMARY

A vehicle and methods of operation according to the present disclosure include various components and systems that include one or more controllers coupled with a powertrain that has at least two EMs coupled to respective batteries or other energy storage devices, and vehicle axles, and the CE coupled to one of the axles. The disclosure enables various modes of operation that include delivering power to single, multiple, and/or all axles. Additionally, such components and systems are also configured to enable battery charge sustain, charge deplete, and other battery configurations and utilization modes of operation, which are optimized for short duration, high power operations, as well as longer duration, high energy operations, and related configurations and utilization modes.

In one configuration of the disclosure, a vehicle or HEV includes at least one controller that is coupled to at least two axles that are each independently driven by respective EMs, which EMs are each coupled to a separate battery, and which axles are mechanically decoupled. The at least one controller is configured to deliver power from one of the EMs to the respectively coupled axle in a single axle drive mode. In response to a torque demand signal (TDS), which exceeds a single axle power limit, the controller(s) engage a multiple axle drive mode to deliver power from another EM to another respectively coupled axle. In additional variations, the at least one controller is also configured to respond to a braking signal, to adjust at least one of the EMs, to capture mechanical braking energy from a respectively coupled axle, and to utilize this braking energy with the one EM, to generate negative torque to charge at least one and/or one or more of the batteries.

In further arrangements of the disclosure, the controller(s) are further configured to respond to the TDS when it exceeds a multiple axle power limit, and to enable delivery of additional CE power to the coupled axle. Another variation includes the vehicle including a PHEV battery and the controller(s) also enabled to engage a charge deplete mode, which causes one or more of the batteries to supply power to the respectively coupled EM at up to a charge deplete maximum discharge limit (CDMD), which in combination with the added CE power is delivered to one of the axles. The disclosure also contemplates PHEV battery variations of the vehicle configured with the at least one controller further configured to respond to a state of charge signal (SoC signal) that decreases to a charge sustain limit. The at least one controller responds and engages a vehicle charge sustain mode, which delivers CE power to the EM that is coupled to the one axle to generate electric power, and to charge one or more of the batteries, and in certain applications to discharge power, at up to a charge sustain maximum discharge limit (CSMD). This enables the at least one controller to drive the EMs to propel the HEV even while recharging one or more batteries.

The vehicle may also be configured with the controller(s) modified to respond to at least one of: (a) the SoC signal decreasing to a charge sustain limit (for example, in vehicles having PHEV batteries) and (b) the TDS exceeding combined power available from the batteries. Such controller(s) are also modified to, and in response to engage a charge sustain mode and deliver CE power to: (a) propel the vehicle and meet the power demanded by TDS, and (b) the EM coupled to the one axle to generate electric power to charge one or more of the batteries. In other variations, the disclosure includes the vehicle with the at least one controller further configured to respond to, in the PHEV battery variations, the SoC signal decreasing to a charge sustain limit for at least one of the batteries, and to engage a charge sustain mode and deliver CE power to the EM coupled to the one axle to generate electric power, to motivate one or more of the EMs such that the SoC does not decrease.

The HEV and controller(s) of the disclosure are also configured to respond to a stability control signal (SCS), and to engage an all axle drive mode to deliver power independently to each of the at least two axles to increase traction of each wheel of each axle. In other adaptations of the disclosure, for example in vehicles having FHEV configurations, any or all or at least one battery(ies) are configured to operate in a charge sustain mode and to have an energy capacity of approximately one kilowatt-hour. In certain variations, this adaptation enables an electric operating range or electric range, for purposes of example, of about between one to three miles or somewhat further, when utilized at moderate vehicle accelerations and speeds less than about 30 miles per hour.

Other of the at least one batteries are or may be configured to operate in dual charge sustain and depletion modes, which are often enabled in PHEV batteries. While energy and power capacities for such batteries vary widely across manufacturers and vehicle types, in one example that is not intended to limit the disclosure, such batteries can be configured to have an energy capacity of approximately between two and 10 kilowatt-hours, or more or less, and an electric range or operating range of about between two and 49 miles, or more or less. In still further variations, the one or more batteries include or may include at least one battery also configured to operate in a charge depletion mode and to have an energy capacity of approximately exceeding 10 kilowatt-hours and an electric operating range or electric range exceeding about 50 miles.

The disclosure contemplates methods of controlling the vehicle and adjusting the controller(s) and delivering power to one of the axles in a single axle drive mode, and, in response to the TDS exceeding a single axle power limit, delivering power independently to another axle. The disclosure further includes controller(s), in response to the TDS exceeding a multiple axle power limit, for example in PHEV configured vehicles, engaging a charge deplete mode to deliver battery power at up to the CDMD, and delivering additional CE power to the coupled axle. Further variations for such exemplary PHEV configurations also include the controller(s) configured to, in response to the TDS exceeding a single axle power limit, delivering addition CE power to the coupled axle, and in response to the TDS exceeding the multiple axle power limit, delivering power independently to another axle, such as by an electric rear or front axle drive and coupled FHEV battery(ies). Other variations have the controller(s) being responsive to the braking signal, and adjusting at least one of the electric machines (EMs), to capture mechanical braking energy from a respective axle, and to generate negative torque by the at least one EM to charge the coupled separate battery.

The methods of the disclosure also further include or may include the controller(s) responsive to the SoC signal decreasing to a charge sustain limit, for example in PHEV configured vehicles, and delivering CE power to the electric machine (EM) coupled to the one axle to generate electric power to charge one or more of the batteries. Additionally, the methods include the at least one controller or the controller(s) responsive to at least one of: (a) the SoC signal decreasing to a charge sustain limit and (b) the TDS exceeding combined power available from the batteries, and engaging a charge sustain mode delivering CE power to: (a) propel the vehicle and meet the power demanded by TDS, and (b) the EM coupled to the one axle to generate electric power to charge one or more of the batteries.

This summary of the implementations and configurations of these vehicles and methods of operation describe in less technically detailed variations, several exemplary arrangements for the embodiments of this disclosure, and such are further described in more detail below in the detailed description in connection with the accompanying illustrations and drawings, and the claims that follow.

This summary is not intended to identify key features or essential features of the claimed technology, nor is it intended to be used as an aid in determining the scope of the claimed subject matter. The features, functions, capabilities, and advantages discussed here may be achieved independently in various example implementations or may be combined in yet other example configurations, as is further described elsewhere herein, and which may also be understood by those skilled and knowledgeable in the relevant fields of technology, with reference to the following description and drawings.

DETAILED DESCRIPTION

Embodiments of the present disclosure are described herein. It is to be understood, however, that the disclosed embodiments are merely examples, and that other embodiments and alternative arrangements thereof can take other various and preferably optional forms. The figures include some features that may be exaggerated or minimized to show or emphasize details of certain components. Therefore, specific structural and functional details disclosed herein are not to be interpreted as limiting, but merely as a representative and illustrative basis for demonstrating to and teaching those skilled in the art to variously employ the embodiments of this disclosure.

As those of ordinary skill in the art should understand, various features, components, and processes illustrated and described with reference to any one of the figures may be combined with features, components, and processes illustrated in one or more other figures to produce embodiments that should be apparent to and within the knowledge of those skilled in the art, but which may not be explicitly illustrated or described. The combinations of features illustrated here are representative embodiments for many typical applications. Various combinations and modifications of the features consistent with the teachings of this disclosure, however, could be desired for particular applications or implementations, and should be readily within the knowledge, skill, and ability of those working in the relevant fields of technology.

Figure 1:
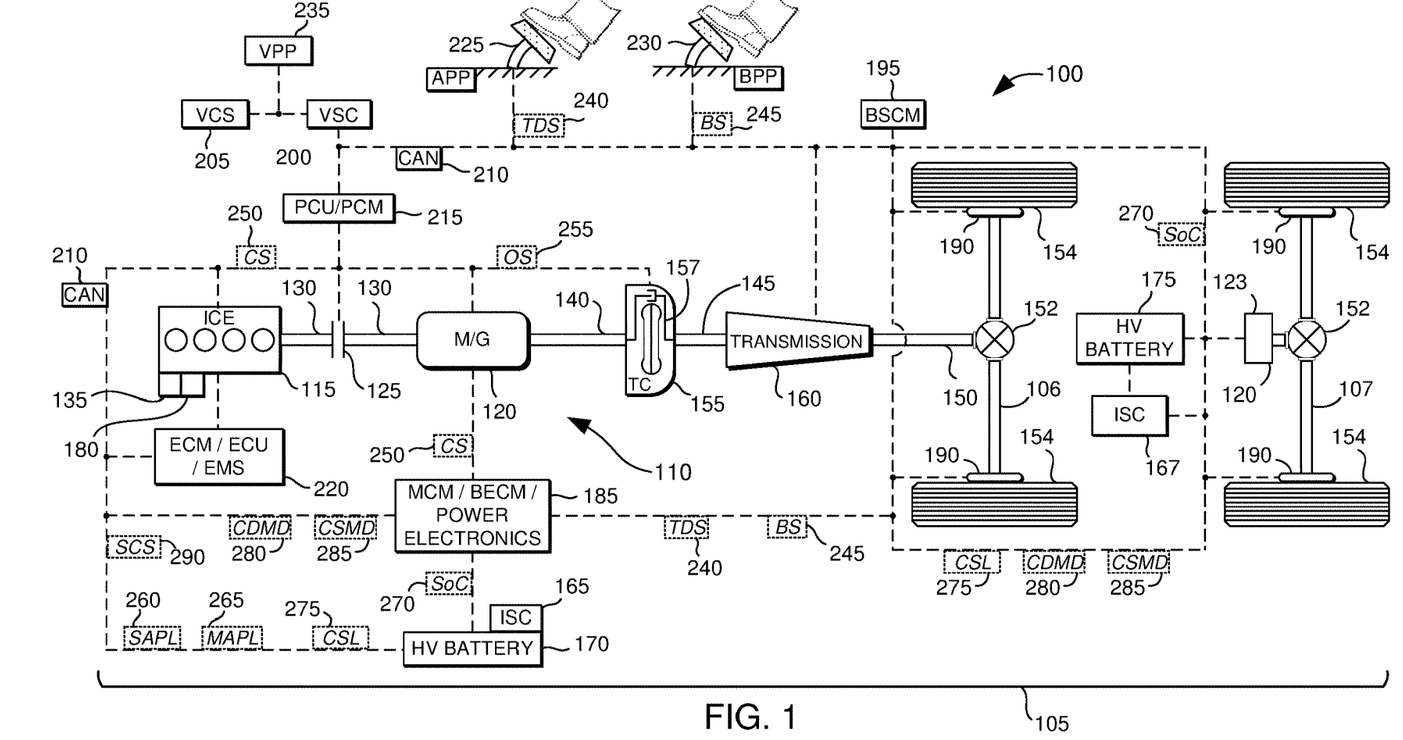
FIG. 1 is an illustration of a hybrid electric vehicle and its systems, components, sensors, and methods of operation.
Figure 2:
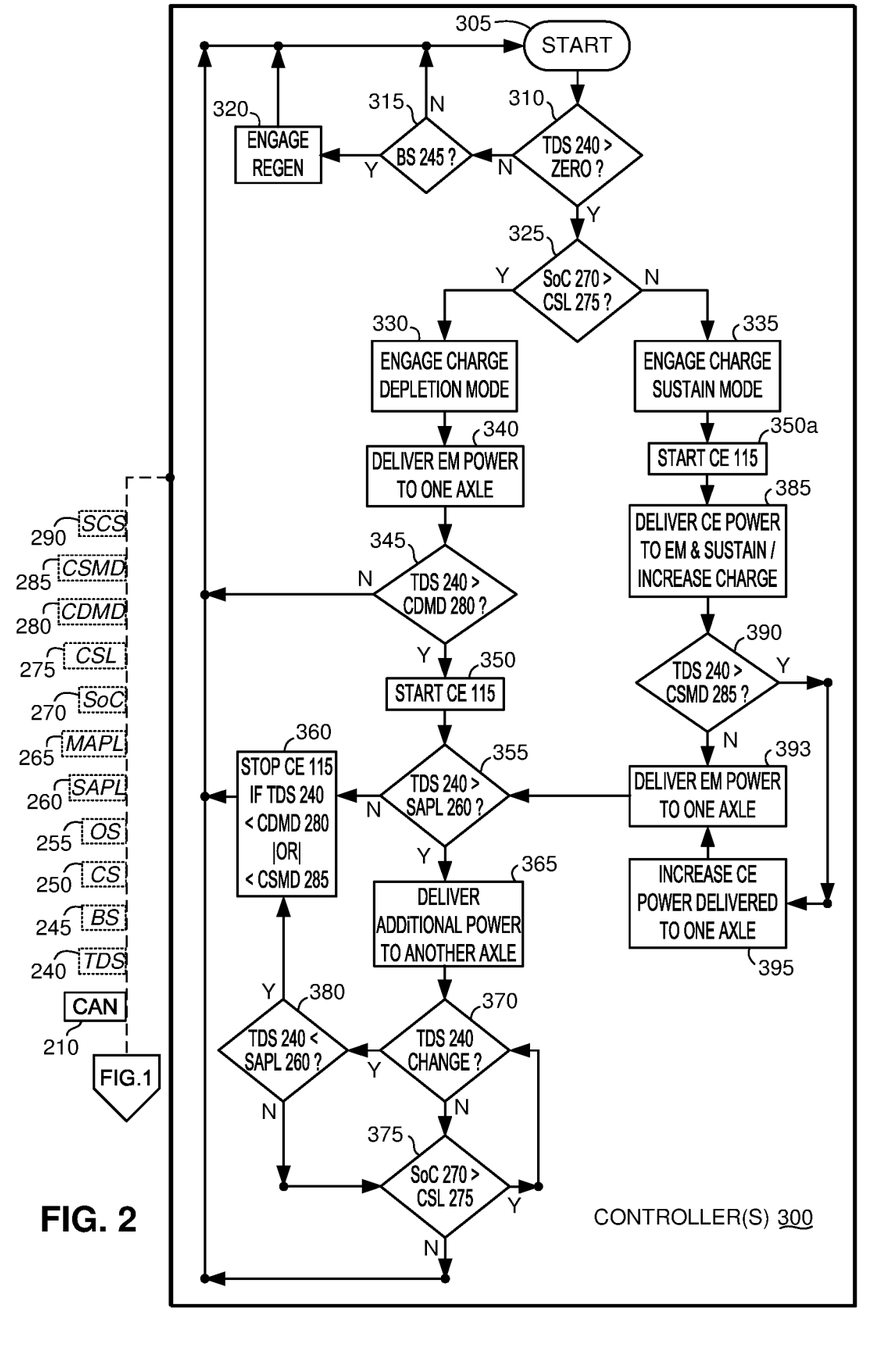
FIG. 2 illustrates additional aspects and capabilities of the vehicle and systems and methods of FIG. 1, with certain components and features added, removed, modified, and rearranged.

With reference now to the various figures and illustrations and to FIGS. 1 and 2, and specifically to FIG. 1, a schematic diagram of an electric, battery, plug-in, and/or HEV 100 is shown, and illustrates representative relationships among components of HEV 100. Physical placement and orientation of the components within vehicle 100 may vary. Vehicle 100 includes a driveline 105 that has at least two axles 106, 107, and a powertrain 110, which includes one or more of an internal combustion engine (CE, ICE) 115 and/or electric machine or electric motors/generators/starters (EMs) 120, which generate power and torque to propel vehicle 100 via the at least two axles 106, 107, which are contemplated by this disclosure and reflected in FIG. 1 to be mechanically decoupled from one another to enable independent operation.

Although the figures depict axles 106, 107 and related components appearing to be physically adjacent, the figures are only intended to be schematic representations, and contemplate axles 106, 107, as well as all other components, to be arranged according to various other physical arrangements. For example, despite the schematic representation, axles 106, 107 may be arranged on an HEV 100 as separated, independently operable, front and rear wheel drive axles 106, 107, and in other physical arrangements that should be apparent to those knowledgeable in the relevant fields of technology.

Engine 115 is a gasoline, diesel, biofuel, natural gas, or alternative fuel powered engine, or a fuel cell, which generates an output torque in addition to other forms of electrical, vacuum, pressure, and hydraulic power by way of front end engine accessories and accessory devices (FEADs) described elsewhere herein. ICE or CE 115 is coupled to at least one of the electric machines or EMs 120 with a disconnect clutch 125, and at least one of the axles 106. CE 115 generates such power and associated engine output torque for transmission to EM 120 when disconnect clutch 125 is at least partially engaged.

EM 120 may be any one of a plurality of types of electric machines, and for example may be a permanent magnet synchronous motor, an electrical power generator, and an engine starter. For example, when disconnect clutch 125 is at least partially engaged, power and torque may be transmitted from engine 115 to EM 120 to enable operation as an electric generator, and to other components of vehicle 100. Similarly, the EM 120 coupled to the same axle 106 as CE/ICE 115 may operate as a starter for engine 115 with disconnect clutch 125 partially or fully engaged to transmit power and torque via disconnect clutch drive shafts 130 to CE 115 to start engine/ICE/CE 115, in vehicles that include or do not include an independent engine starter 135.

In additional variations, EM 120 may also be an electric axle drive 123 that is configured as either an electric front axle drive (EFAD) or an electric rear axle drive (ERAD) that is directly coupled with one of the axles 106, 107 via a gear box and/or differential 152. Further, in such arrangements EFAD/ERAD 123 may be configured to operate independently of other EMs 120 and/or CE 115, to enable selectable and differential control between mechanically decoupled axles 106, 107 and associated wheels 154.

Further, at least one EM 120, 123 may assist engine 115 in a "hybrid electric mode" or an "electric assist mode" by transmitting additional power and torque to turn drive shafts 130 and 140. Also, EMs 120, 123 may operate in an electric only mode wherein engine 115 is decoupled by disconnect clutch 125 and shut down, enabling EMs 120, 123 to transmit positive or negative torque to EM drive shaft 140 and/or axles 106, 107. When in generator mode, EMs 120, 123 may also be commanded to produce negative torque and to thereby generate electricity for charging batteries (and other energy storage devices) and powering vehicle electrical systems, while engine or ICE 115 is generating propulsion power for vehicle 100. EMs 120, 123 also may enable regenerative braking by converting rotational energy from decelerating powertrain 110 and/or wheels 154 into electrical energy for storage, as described in more detail below, in one or more batteries 170, 175, 180, and other energy storage devices.

Disconnect clutch 125 may be disengaged to enable engine 115 to stop or to run independently for powering engine accessories, while EMs 120, 123 generate drive power and torque to propel vehicle 100 via axles 106, 107, and/or EM drive shaft 140, torque convertor drive shaft 145, and transmission output drive shaft 150. In other arrangements, both engine 115 and EMs 120, 123 may operate with disconnect clutch 125 fully or partially engaged to cooperatively propel vehicle 100 through drive shafts 130, 140, 150, differential 152, and wheels 154. Various configurations and utilizations of EMs 120, 123 may be employed to enable differential control and traction between axles 106, 107, and/or associated wheels 154.

Differentials 152 may transmit approximately equal torque to each wheel 154 and may accommodate slight speed differences to enable the vehicle to efficiently turn and maneuver. Different types of differentials 152 or similar devices may be used to distribute equal and/or unequal torque from powertrain 110 to wheels 154, for rear-dive, front-drive, front-axle, rear-axle, and all-wheel drive vehicles and configurations. In some vehicles, differential torque distribution may be controlled and varied to enable desired operating modes or conditions wherein each vehicle axle 106, 107, and/or each wheel 154 receives different torque. Similarly, during regenerative braking modes, EMs 120, 123 may be configured to recapture mechanical energy from axles 106, 107 and/or wheels 154 to generate electrical energy for recharging one or more batteries 170, 175, 180.

Drive shaft 130 of engine 115 and EM 120 may be a continuous, single, through shaft that is part of and integral with EM drive shaft 140, or may be a separate, independent drive shaft 130 that may be configured to turn independently of EM drive shaft 140, for powertrains 110 that include multiple, inline, or otherwise coupled EM 120 configurations. The schematic of FIG. 1 also contemplates alternative configurations with more than one engine 115 and/or EMs 120, 123, which may be offset from drive shafts 130, 140, and where one or more of engines 115 and EMs 120, 123 are positioned in series and/or in parallel elsewhere in driveline 105, and/or about axles 106, 107, such as between or as part of a torque convertor and a transmission, off-axis from the drive shafts, axles 106, 107, and/or elsewhere and in other arrangements. Still other variations are contemplated without deviating from the scope of the present disclosure.

Driveline 105 and powertrain 110 also include a torque convertor (TC) 155, which couples CE 115 and EM 120 of powertrain 110 with and/or to a transmission 160. Transmission 160 may be a multiple step-ratio, and/or a multiple and variable torque-multiplier-ratio, automatic and/or manual transmission or gearbox 160 having a plurality of selectable gears. TC 155 may further incorporate a bypass clutch and clutch lock 157 that may also operate as a launch clutch, to enable further control and conditioning of the power and torque transmitted from powertrain 110 to other components of vehicle 100. Transmission 160 may include TC 155 and bypass clutch 157 to be integral with transmission or gearbox 160 in some variations. In other contemplated variations, for purposes of further example but not limitation, HEV 100 is configured to be a powersplit vehicle, such that transmission 160 is configured in a split-transmission arrangement that is employed without differentials 152 and/or without TC 155 to enable direct control of power transmitted to and regenerative power recovered or captured from wheels 154.

Powertrain 110 and/or driveline 105 further include one or more invertor system controller(s) (ISC or ISCs) 165, which are coupled to the various other system controller(s) and respective EMs 120, 123 and batteries 170, 175, and/or 180, any and/or each of which components may be cooperatively and independently adjustable, selectable, and operable. In some optionally preferred arrangements, at least one EM 120 is respectively coupled with one axle 106 and one separate battery 170 and one separate ISC 165, and another EM 120, such for example EM 123, is respectively coupled with a different axle 107, a different and separate battery 175, and a different and separate ISC 167. In further variations, one separate ISC 165 may be coupled with a front axle of HEV 100, which may be either of axles 106, 107, and may be referred to as a front ISC or FISC 165, while the other ISC 167 may be coupled with a rear axle, which would be another of the axles 106, 107, such that it may be referred to as a rear ISC or RISC 167. In this example, FISC 165 may be utilized to front wheel drive (FWD) operation, while RISC 167 may be utilized for rear wheel drive (RWD) operation, and both may be used for all wheel drive (AWD) operation.

One or more such batteries 170, 175 are and may be a higher voltage, direct current battery or batteries 170, 175 operating in various ranges according to the intended vehicle configuration and applications. In various examples, illustrated here for purposes of example but not limitation, such batteries can be configured to operate in ranges up to about 600 volts, and prospectively as high as about 1,000 volts, and sometimes between about 140 and 420 volts, or more or less, which is/are used to store and supply power for EM 120, and other vehicle components and accessories. Other batteries can be a low voltage, direct current battery(ies) 180 operating in the range of between about 6 and 24 volts and 48 volts, or more or less, which is/are used to store and supply power for starter 135 to start CE 115, for such exemplary HEVs 100 that may include a starter in some adaptations, and for powering other vehicle components and accessories during vehicle idle, stop, engine off, and electric motor/generator off conditions.

Although the batteries 170, 175, 180 described here for purposes of example may be known to those skilled in the technology as lead-acid, lithium ion, nickel metal hydride, and other chemistries, many other energy storage devices are contemplated herein as being suitable for purposes of the disclosure. For further example, such batteries 170, 175, 180 may cooperatively storage energy with and/or may be replaced entirely by ultracapacitors, flywheels, fuel cells, and a number of energy storage devices and associated components and systems, which may be utilized alone, in combination, and as supplemental and/or replacement devices for the contemplated energy storage purposes of the exemplary and illustrative chemical batteries.

In these arrangements, and for various HEVs 100 that may be configured as a plug-in HEV (PHEV), and/or full HEV (FHEV), one or more of the batteries 170, 175 may be further configured to operate in charge sustain and/or charge depletion modes according to the mode of vehicle operation and configuration of the specific battery. Those skilled in the field of technology may be able to understand that such exemplary, combined charge sustain and charge depletion modes of operation are typically confined to such HEVs 100 that are configured with at least one PHEV configured battery or batteries, since other types of such contemplated batteries are designed and/or preferred for non-PHEV modes of operation such as either charge sustain or charge depletion modes but not both. For further example, battery(ies) 170, 175 may be selected and configured to have an energy capacity of approximately one kilowatt-hour. This exemplary arrangement is for purposes of illustration, and as a further example can enable an electric range or operating range of about 1 to 3 miles or so during vehicle speeds under about 30 miles per hour and when vehicle accelerations are mild. In this way, the batteries 170, 175 may be utilized in FHEVs as a "power cell" battery enabling relatively high discharge rates at up to charge depletion and/or charge sustain maximum discharge limit rates, for comparatively short time durations and limited distances, speeds, and accelerations, when compared to other types of battery configurations and HEV modes of operation.

In another example, at least one and/or another of the battery(ies) is configured to operate in alternating and/or both charge sustain and charge depletion modes, and in some applications as a power cell and in other applications as an "energy cell" and PHEV battery. For further examples, but not for purposes of limitation, such batteries and/or may have an energy range, depending upon the vehicle configuration and intended applications, of approximately between 2 and 10 kilowatt-hours, or more or less, and an electric operating range or electric range of about between 2 and 49 miles, or more or less. When utilized in combination with the various controller(s) of such HEVs 100, such as ISCs 165, 167, and other components, these batteries, for purposes of example without limitation, can be utilized in FHEV and PHEV configured HEVs 100, and may be employed with various other of such batteries 170, 175 to increase flexibility in configuring and utilizing such HEVs 100 and integrated components and systems.

The disclosure further contemplates one or more and/or at least one battery(ies) being configured to operate in a PHEV charge depletion mode as an energy cell having relatively higher energy storage capacity and time/distance utilization ranges, and to have an energy capacity of approximately exceeding 10 kilowatt-hours, or thereabout, and an electric range or electric operating range exceeding about 50 miles or so, and which can be adapted to have an energy capacity of approximately 10 to 30 kilowatt-hours or more or less, and an electric operating range of about 50 to 300 miles or more or less. Such "energy cell" configurations may be utilized in either or both charge deplete and sustain modes, to enable energy storage device discharge rates at up to respective charge depletion maximum discharge limit (CDMD) and charge sustain maximum discharge limit (CSMD) rates.

Batteries 170, 175, 180 are respectively coupled to engine 115, EMs 120, 123, ISCs 165, 167, and other components, controllers, and systems of vehicle 100, as depicted in FIG. 1, through various mechanical and electrical interfaces and vehicle controllers, as described elsewhere herein. High voltage EM batteries 170, 175 are coupled together and/or separately to EMs 120, 123, and ISCs 165, 167, by one or more of a motor control module (MCM), a battery energy and/or electrical control module (BCM or BECM), and/or power electronics 185.

These components are cooperatively configured to condition direct current (DC) power provided by high voltage (HV) batteries 170, 175 for EMs 120, 123. ISCs 165, 167, and/or MCM/BCM/BECM 185 are also configured to condition, invert, and transform DC battery power into three phase alternating current (AC) as is typically required to power electric machines or EMs 120, 123. MCM/BCM/BECM 185 and/or ISCs 165, 167 are also configured to charge one or more batteries 170, 175, 180 with electrical energy generated by EMs 120, 123, and/or FEAD components, and to supply power to other vehicle components as needed.

Vehicle 100 may also incorporate one or more brakes 190 coupled to one or more of axles 106, 107, wheels 154, and brake system control module (BSCM) 195. Axles 106, 107, brakes 190, and/or BSCM 195 may be operative to mechanically (for example, frictionally) and/or electrically decelerate wheels 154, and to enable electrically regenerative braking that captures mechanical deceleration energy from wheels 154, and in cooperation with one or more of ISCs 165, 167, MCM/BECM 185, EMs 120, 123, and possibly other controllers and components, enables generation of electricity for storage in and charging of HV battery(ies) 170, 175, and other batteries 180, and other power storage components.

With continued reference to FIG. 1, vehicle 100 further includes one or more controllers and computing modules and systems that enable a variety of vehicle capabilities. For example, vehicle 100 may incorporate a vehicle system controller (VSC) 200 and a vehicle computing system (VCS) and controller 205, which are in communication with ISCs 165, 167, MCM/BECM 185, BSCM 195, and other controllers, and a vehicle network such as a controller area network (CAN) 210, and a larger vehicle control system and other vehicle networks that include other micro-processor-based controllers as described elsewhere herein. CAN 210 may also include network controllers in addition to communications links between controllers, sensors, actuators, and vehicle systems and components.

Such CANs 150 are known to those skilled in the technology and are described in more detail by various industry standards, which include for example, among others, Society of Automotive Engineers International™ (SAE) J1939, entitled "Serial Control and Communications Heavy Duty Vehicle Network", and available from standards.sae.org, as well as, car informatics standards available from International Standards Organization (ISO) 11898, entitled "Road vehicles—Controller area network (CAN)," and ISO 11519, entitled "Road vehicles—Low-speed serial data communication,", available from www.iso.org/ics/43.040.15/x/.

While illustrated here for exemplary purposes, as discrete, individual controllers, ISCs 165, 167, MCM/BECM 185, BSCM 195, VSC 200 and VCS 205 may control, be controlled by, communicate signals to and from, and communicate with other controllers, and other sensors, actuators, signals, and components that are part of the larger vehicle and control systems and internal and external networks. The capabilities and configurations described in connection with any specific micro-processor-based controller as contemplated herein may also be embodied in one or more other controllers and distributed across more than one controller such that multiple controllers can individually, collaboratively, in combination, and cooperatively enable any such capability and configuration. Accordingly, recitation of "a controller," "at least one controller," "one or more controllers," and/or "the controller(s)" is intended to refer to such controllers both in the singular and plural connotations, and individually, collectively, and in various suitable cooperative, embedded, and distributed combinations.

Further, communications over the network and CAN 210 are intended to include responding to, sharing, transmitting, and receiving of commands, signals, data, control logic, and information between controllers, and sensors, actuators, controls, and vehicle systems and components. The controllers communicate with one or more controller-based input/output (I/O) interfaces that may be implemented as single integrated interfaces enabling communication of raw data and signals, and/or signal conditioning, processing, and/or conversion, short-circuit protection, circuit isolation, and similar capabilities. Alternatively, one or more dedicated hardware or firmware devices, controllers, and systems on a chip may be used to modify, convert, precondition, and preprocess particular signals during communications, and before and after such are communicated.

In further illustrations, ISCs 165, 167, MCM/BECM 185, BSCM 195, VSC 200, VCS 205, CAN 210, and other controllers, may include one or more microprocessors or central processing units (CPU) in communication with various types of computer readable storage devices or media. Computer readable storage devices or media may include volatile and nonvolatile storage in read-only memory (ROM), random-access memory (RAM), and non-volatile or keep-alive memory (NVRAM or KAM). NVRAM or KAM is a persistent or non-volatile memory that may be used to store various commands, executable control logic and instructions and code, data, constants, and variables needed for operating the vehicle and systems, while the vehicle and systems and the controllers and CPUs are unpowered or powered off. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data.

With attention invited again to FIG. 1, vehicle 100 also may include VCS 205 to be the SYNC onboard vehicle computing system manufactured by the Ford Motor Company (See, for example, SmartDeviceLink.com, www.ford.com, U.S. Pat. Nos. 9,080,668, 9,042,824, 9,092,309, 9,141,583, 9,141,583, 9,680,934, and others). Vehicle 100 also may include a powertrain control unit/module (PCU/PCM) 215 coupled to VSC 200 or another controller, and coupled to CAN 210 and engine 115, EMs 120, 123, and TC 155 to control each powertrain component. A transmission control unit may also be coupled to VSC 200 and other controllers via CAN 210, and is coupled to transmission 160 and also optionally to TC 155, to enable operational control. An engine control module (ECM) or unit (ECU) or energy management system (EMS) 220 may also be included to be in communication with CAN 210, and is coupled to engine 115 and VSC 200 in cooperation with PCU 215 and other controllers.

In this arrangement, VSC 200 and VCS 205 cooperatively manage and control the vehicle components and other controllers, sensors, and actuators. For example, the controllers may communicate control commands, logic, and instructions and code, data, information, and signals to and/or from engine 115, disconnect clutch 125, EMs 120, 123, TC 155, transmission 160, ISCs 165, 167, batteries 170, 175, 180, MCM 185, and BSCM 195, and other components and systems. The controllers also may control and communicate with other vehicle components known to those skilled in the art, even though not shown in the figures. The embodiments of vehicle 100 in FIG. 1 also depict exemplary sensors and actuators in communication with vehicle network and CAN 210 that can transmit and receive signals to and from VSC 200, VCS 205, and other controllers.

The embodiments of vehicle 100 in FIG. 1 also depict exemplary sensors and actuators in communication with vehicle network and CAN 210 that can transmit and receive signals to and from VSC 200, VCS 205, and other controllers. In further examples, vehicle 100 may include an accelerator pedal position and motion sensor (APP) 225, a brake pedal position and motion sensor (BPP) 230, and other driver controls and vehicle profile and performance parameters (VPP) 235, which may include autonomously and/or driver selectable vehicle performance preference profiles and parameters, and autonomous and/or driver selectable vehicle operational mode configurations and sensors, and related profile parameters and settings.

Such VPPs 235 and settings may be autonomously and/or driver selectable, and may establish various preferred and/or predetermined vehicle performance characteristics and modes of operation, as described elsewhere herein. APP 225 may for example be coupled with the various controllers, such as PCU/PCM 215, ECM/ECU 220, and others, to generate and/or enable such controllers to generate a torque demand signal (TDS) 240.

BPP 235 may be further cooperatively coupled to and communicate with other systems, controllers, and sensors including for example brakes 190 and BSCM 195, and be configured to generate and/or enable such controllers to generate a braking signal (BS) 245. Such controllers are and may be configured to respond to BS 245 and to adjust one or more and/or at least one of EMs 120, 123 to recover and capture mechanical braking energy from a respective axle 106, 107, and to generate therefrom negative torque that is converted into electrical energy that is utilized to charge at least one of and/or each of the separate batteries 170, 175, and/or 180, and/or other energy storage devices.

Vehicle 100 may also have VCS 205 configured as and/or with one or more communications, navigation, and other sensors, as described with respect to the SYNC onboard vehicle computing system, and other similar systems. VCS 205 can cooperate with VSC 200 and other controllers to manage and control vehicle 100 in response to sensor and communication signals identified, established by, and received from these and similar vehicle systems and components.

VCS 205 is also configured to cooperate in parallel, in series, and distributively with VSC 200, and other controllers to manage and control the vehicle 100 in response to sensor and communication signals identified, generated by, established by, communicated to, and received from such vehicle systems and components. Such parameters, profiles, and settings of such profiles, may be driver selectable, adjustable, and viewable through a vehicle user interface of an onboard vehicle computing system, such as the above-noted Ford SYNC system, which can be a part of, work in connection with, and/or incorporated as VCS 205, and other controllers and systems.

HEV 100 utilizes such sensors, parameters, and settings to enable performance control operational mode capabilities, in conjunction with the one or more controllers that are configured to manage such capabilities. For example, signals from a driver and various HEV components such as MCM/BCM 185 and APP 230, may demand power from CE 115 and/or EMs 120, 123, and may be embedded in and/or cause the controller(s) to generate TDS 240. In addition to TDS 240 and BS 245, the controllers may also generate various HEV control signals (CS) 250 and other signals (OS) 255, wherein any and/or all of such signals are utilized to communicate data to, between, and from various HEV components, sensors, systems, and controllers. Further, the controllers may embed information in and extract information from such signals, and may also communicate directly with other vehicle controllers, sensors, actuators, systems, and components, to enable various communications and operations.

For further example, various other vehicle functions, actuators, and components may be controlled by the controllers within the vehicle systems and components, and may receive signals from other controllers, sensors, and actuators, which may include, for purposes of illustration but not limitation, an alternator or generator, EMs 120, 123, ISCs 165, 167, high and low voltage batteries 170, 175, 180, and various sensors for regenerative braking, battery charging or discharging, operation mode control signals, maximum charge, state of charge signal (SoC signal), and battery and storage device charge and discharge power limits, charge power limits, discharge power limits, charge depletion and sustain charge limits, and temperature, voltage, current, differentiated and/or integrated current over time, drive train torque commands and detected torques, as well as digital data and information embedded in such signals, and as described in more detail elsewhere herein.

As depicted in the various FIGS. 1 and 2, and elsewhere herein, such control logic and executable instructions and signals, and data can also include vehicle control or command signals received from and sent to vehicle controllers, components, and systems. Such signals and commands may be generated by and communicated from any of the vehicle controllers, sensors, actuators, components, and systems. Other such controller(s), sensor(s), actuator(s), and components may also receive and be responsive to such signals. Any or all of these signals can be raw analog or digital signals or preconditioned, preprocessed, combination, and/or derivative signals generated in response to other signals, and embedding information therein.

The communication and operation of the described signals and commands. control instructions and logic, and data and information by the various contemplated controllers, sensors, actuators, and other vehicle components, may be represented schematically as shown in FIG. 1, and by flow charts or similar diagrams as exemplified in FIG. 2, and elsewhere herein. Such flow charts and diagrams illustrate exemplary commands and control processes, control logic and instructions, and operation strategies, which may be implemented using one or more computing, communication, and processing techniques that can include real-time, event-driven, interrupt-driven, multi-tasking, multi-threading, and combinations thereof.

The steps and functions shown may be executed, communicated, and performed in the sequence depicted, and in parallel, in repetition, in modified sequences, and in some cases, may be combined with other processes and omitted. The commands, control logic, and instructions may be executed in one or more of the described microprocessor-based controllers and may be embodied as primarily hardware, software, virtualized hardware, firmware, virtualized firmware, and combinations thereof.

During operation of vehicle 100, and with continued reference to FIGS. 1 and 2, HEV 100 incorporates controller (s) such as any and/or all of those described elsewhere herein that is/are coupled to EMs 120, 123, ISCs 165, 167, and/or HV battery(ies) 170, 175. The controller(s) is/are configured to respond to the described signals, including for example TDS 240, BS 245, CS 250 and/or OS 255, and to detect various vehicle parameters and conditions, and to adjust various modes of operation of HEV 100 and the various components and systems thereof. In a specific example, HEV 100 includes at least two axles 106, 107 each respectively coupled to and driven by EMs 120 and 123, which EMs 120 and 123 are respectively coupled with separate batteries 170, 175, as is depicted schematically in FIG. 1.

In this example, at least one of the controllers is and may be configured to deliver power to one of the axles 106, 107 in a single axis drive mode of operation, in response to TDS 240. When TDS 240 exceeds a single axle power limit (SAPL) 260, then the controllers are further configured to engage a multiple axle drive mode of operation, and to deliver power to another of axles 106, 107. In either single or multiple axle drive modes, the controllers may deliver power from one or more of EMs 120, 123 in an electric mode of operation, and to axles 106, 107.

Such an electric mode of operation may further include a charge deplete and/or charge sustain mode of operating batteries 170, 175, such that one or all batteries 170, 175 may be discharged in a charge deplete mode, and/or such that one battery may be configured as and/or utilized in a charge sustain mode while another is used in a charge deplete mode, and combinations thereof. In a more specific, further example, the variably changing, combination modes that include both charge deplete and sustain modes would be configured for PHEVs 100, while FHEVs 100 would enable just the charge sustain mode of operation.

HEV 100 may be further configured with controllers responsive to TDS 240 exceeding a multiple axle power limit (MAPL), such that controllers command combustion engine (CE) or ICE 115 to deliver additional power to at least one of the axles 106, 107, in combination with EMs 120, 123. In this arrangement that delivers power from CE 115, one or both batteries 170, 175 are operated in a charge deplete mode. Alternative variations may further include one of the batteries 170, 175 being discharged in charge deplete mode, while another is operated in charge sustain mode such that CE 115 delivers mechanical power to one of EMs 120, 123 that in turn generates negative torque and electrical power to charge and/or sustain charge of the battery in sustain mode, while another of EMs 120, 123 delivers positive torque and power to one of axles 106, 107 in combination with CE 115 delivering power to the same or another of axles 106, 107.

Each of such configurations of HEV 100 is also configured with the controllers and at least one controller further configured to respond to TDS 240, and a state of charge signal (SoC signal) 270 exceeding and/or decreasing to a charge sustain limit (CSL) 275, such as for example when utilizing the FHEV battery and/or mode of operation of HEV 100, of one or more of the energy storage devices such as batteries 170, 175, 180, or another energy storage device. The controllers respond to SoC signal 270 exceeding CSL 275 by enabling the charge deplete mode of HEV 100, such as during the PHEV mode of operation, utilization of the contemplated PHEV battery(ies), and/or configuration of HEV 100. In this variation, one or more energy storage devices, such as batteries 170, 175, are discharged at up to a charge deplete maximum discharge limit (CDMD) 280, to meet the power demanded by TDS 240 by driving EMs 120, 123, and delivering torque to one or more of respective axles 106, 107 and associated wheels 154.

In response to TDS 240, and SoC signal 270 decreasing to CSL 275, the controllers adjust HEV 100 to engage a charge sustain mode, such that energy from the energy storage devices and/or batteries 170, 175 is delivered at up to a charge sustain maximum discharge limit (CSMD) 285, in addition to power from CE or ICE 115 being delivered to one or more of EMs 120, 123 that is/are coupled to the same axle 106, 107 of CE 115, which enables electricity generation that is utilized to charge one or more of the various contemplated energy storage devices, including for example batteries 170, 175, 180, to maintain respective SoCs 270 and/or to recharge the energy storage devices such as batteries 170, 175, and/or 180.

In response to TDS 240, SAPL 260, MAPL 265, SoC signal 270, CSL 275, CDMD 280, and/or CSMD 285, the controllers are further configured to engage the charge sustain mode, and adjust CE 115 to deliver power in addition to energy storage device power, to (a) propel HEV 100 to meet the power demanded by TDS 240, and to also deliver CE 115 power to at least one of axles 106, 107 and respectively coupled EMs 120, 123 to generate electric power to maintain the SoC signal 270 at and/or near CSL 275, while recharging one or more of the energy storage devices, such as batteries 170, 175, and/or 180.

In other variations of the HEV 100 according to the disclosure, the controllers are also responsive to SoC 270, for at least one of the energy storage devices, such as batteries 170, 175, 180, decreasing to CSL 275, to engage charge sustain mode, and in addition to delivering power from EMs 120, 123 to propel HEV 100, to also deliver power from CE 115 to the EM 120, 123 coupled to the same axle 106, 107 as CE 115. The added power from CE 115 motivates one or more of the EMs 120, 123 to generate electric power to maintain SoC 270 at or near CSL 275, and to charge the appropriate energy storage device, such that the SoC 270 does not decrease below CSL 275. The controllers may also enable sustaining and/or recharge of energy storage devices so that SoC signal 270 increases and/or is maintained near CSL 275 within a desired tolerance range, which range can enable a range of SoCs near CSL 275 that may be acceptable for sustaining stored energy in the devices during operation of HEV 100.

The disclosure also contemplates other variations that include the controller(s) responsive to a stability control signal (SCS) 290, which may be autonomously and/or driver selectable in response to environmental and road conditions, as well as HEV 100 performance characteristics, and/or other parameters. The controller(s) may reconfigure and/or adjust HEV 100 capabilities responsive to SCS 290 such that certain modes of operation of HEV 100 are enabled and/or engaged. For example, an all axle drive mode may be selected, which for a two axle HEV 100 may enable power to be delivered to both axles 106, 107, and to adjust other components such as differentials 152 to further adjust, increase, and/or decrease traction, power, and/or torque to each associated wheel 154, collectively, in tandem, individually, and in combinations thereof.

In each of such configurations, variations, modifications, and/or modes of operation that are described herein, such limits, variables, parameters, and modes can be predetermined, predicted, automatically selected, and/or otherwise adjusted as the VPPs 235, which VPPs 235 contemplate and may include the various limits such as SAPL 260, MAPL 265, SoC signal 270, CSL 275, CDMD 280, CSMD 285, SCS 290, and/or related limits and parameters The disclosure also contemplates additional methods of operation, which may be understood by those knowledgeable in the relevant fields of technology with continuing reference to FIG. 1, including specifically now also to FIG. 2. During operation, one or more of the controller(s) 300 described elsewhere herein, such for example without limitation, MCM/BECM 185, VSC 200, PCU/PCM 215, ECM/ECU 220, are configured to enable the capabilities of HEV 100 contemplated in the disclosure, and during the various modes of operation. The controller(s) 300 initiates commands and control logic at step 305, according to the predetermined, predicted, autonomously and driver selected modes and VPPs 235.

According to such modes and VPPs 235, the controllers then next determine at step 310 whether TDS 240 exceeds zero, which establishes that a demand for torque power is detected. If TDS 240 does not exceed zero, then control passes to step 315 to detect whether BS 245 exists. If BS 245 is detected, then one or more EMs 120, 123 are adjusted at step 320 and regenerative braking is engaged such that one or more of EMs 120, 123 generate electricity that is recaptured and stored in energy storage devices, such as one or more of batteries 170, 175, 180. If BS 245 is not detected, control returns to start step 305 for continued monitoring.

If at step 310 TDS 240 is greater than zero, then control passes to step 325 to determine whether one or more of energy storage devices such as batteries 170, 175 have a SoC signal 270 that exceeds CSL 275. If so, then electric only operation of HEV 100 is possible, such as for example during PHEV battery utilization and/or mode operation, and may be enabled according to VPPs 235, and in one of the modes of operation described herein. If SoC signal 270 exceeds CSL 275 then control proceeds to step 330 and charge depletion mode is engaged, which is only enabled for PHEV configured HEVs 100. Otherwise, if SoC signal 270 has decreased to and/or near CSL 275, then charge sustain mode is engaged at step 335, which is enabled for either PHEV or FHEV configured HEVs 100

With charge depletion mode engaged at step 330, then at step 340 power is delivered from at least one of EMs 120, 123 to at least one of axles 106, 107. The controllers then proceed to step 345 to determine whether TDS 240 exceeds CDMD 280, and if not then monitoring continues and control moves again to start step 305. Alternatively, when CDMD 280 is exceeded by TDS 240, then the controllers 300 start CE 115 at step 350 to enable delivery of additional power from CE 115 to the at least one axle 106, 107 to augment the maximum energy being delivered to the at least one of EM 120, 123 that is delivering power to and driving the axle. At step 355, the controller(s) also determine whether TDS 240 also exceeds SAPL 260. If TDS 240 does not exceed SAPL 260, and no longer exceeds CDMD 280, then the controllers 300 may stop CE 115 at step 360, in accordance with other parameters and variables.

However, if at step 355 TDS 240 exceeds SAPL 260, then controllers 300 may at step 365, enable additional power to be delivered to another of the at least two axles 106, 107. In one example, the controllers 300 may increase the power being delivered by CE 115. In another example, the controllers 300 may enable another of EMs 120, 123 to deliver power to the additional axle of axles 106, 107. In this latter example, HEV 100 may include EM 123 to be an ERAD that is powered by a separate high-discharge-power storage device coupled with ISC 167, to enable short duration/distance power to be delivered to the other axle while TDS 240 continues to exceed SAPL 260.

While delivering the additional power at step 365, the controllers continue monitoring at step 370, TDS 240 for changes, and monitoring at step 375, SoC signal(s) 270 (of the energy storage devices) to determine if SoC signal(s) 270 decrease(s) below CSL 275 during operation. If at step 370, TDS 240 does not change, then SoC signal(s) 270 are monitored at step 375 until a decrease below CSL 275 is detected. If TDS 240 remains unchanged, but TDS 240 decreases below CSL 275, then the controllers 300 continue the methods of the disclosure by returning to start step 305 for continued monitoring and processing, and to make adjustments to HEV 100 in response to the decreased SoC signal(s) 270. Once TDS 240 changes at step 370, the controllers at step 380 again determine if TDS 240 has decreased below SAPL 260, and if not, monitoring of SoC signal(s) 270 continues at step 375. But when TDS 240 decreases below SAPL 260 at step 380, then the controllers 300 may stop CE 115 at step 360 according to various other limits and VPPs 235, and thereafter continue monitoring at start step 305.

If charge sustain mode is engaged at step 335, then CE 115 is started at step 350a, to deliver power from CE 115 to one of EMs 120, 123, to enable at step 385, recharge and/or sustaining of SoC of the energy storage device(s) that were depleted below CSL 275. The controller(s) 300 at step 390 determine if TDS 240 exceeds CSMD 285, and if it does not, then at step 393 power is delivered from at least one of the EMs 120, 123, to at least one axle of axles 106, 107, up to CSMD 285. However, if at step 390, TDS 240 exceeds CSMD 285, then the controller(s) 300 increase power being delivered from CE 115 above that delivered to EMs 120, 123 for charge sustaining power, to enable added CE 115 power to be delivered to one of the axles 106, 107 and/or to one of the EMs 120, to propel HEV 100 and meet the power demanded by TDS 240. This enables power delivery for propulsion of HEV 100, during charge sustain mode, such that combined power from at least one of EMs 120, 123 (step 393) and CE 115 (step 395) is utilized for both propulsion and sustaining charge of the energy storage devices, such as batteries 170, 175.

The descriptions herein refer to systems, methods, components, elements, nodes, or features being in "communication" and or "coupled" together. As used herein, unless expressly stated otherwise, use of these terms and words are intended and must be understood to mean that one system/method/sensor/actuator/component/element/module/feature is directly or indirectly coupled, joined to, and/or communicates with another, either electronically, mechanically, or both and in some similar way that enables cooperative operation and exchange and interchange of data and information.

Further, even though the various described implementations, figures, illustrations, and drawings depict representative examples and arrangements of components, elements, devices, and features, many different additional variations, arrangements, modifications, and intervening components, elements, devices, and features, may also be present in further exemplary implementations that are contemplated by the present disclosure.

Terms, words, and phrases used in this document, and variations thereof, unless otherwise expressly stated, must be construed as open ended as opposed to limiting. For example, the term "including" should be understood to mean "including, without limitation" or similar meanings; the term "example" is used to loosely describe illustrative instances of the item being described, but is not an exhaustive, exclusive, or limiting list; and adjectives such as "conventional," "traditional," "normal," "standard," "known", and terms with similar meanings must not be construed to limit the description to a given example, or to an exemplary item commercially available in the market as of a specific date and time period.

Instead, these descriptions are intended to be understood to include conventional, traditional, normal, or standard technologies that may be available now and at any time in the future in some improved and modified form according to the innovations described in this disclosure. Similarly, a group of words described and joined with the conjunction "and" or the disjunctive "or" must be understood only as exemplary and representative but not exclusive groups, and not as requiring that only or each and every one of those described items must be or must not be present in the contemplated group. Rather, use of such conjunctives and disjunctives must be understood to mean "and/or" unless expressly stated otherwise.

Similarly, a group of words linked with the conjunction "or" must not be understood as requiring mutual exclusivity among that group, but rather must also be understood as meaning "and or" unless expressly stated otherwise. Also, although words, items, elements, or components of this disclosure are described or claimed in the singular, the plural is also intended and contemplated to be within the scope of such a description unless limitation to the singular is explicitly stated as a requirement. The presence or absence of broadening words and phrases such as "one or more," "at least," "but not limited to" or other like phrases in some instances are intended to be interpreted to contemplate broader meanings, but must not be understood to mean that narrower meanings are implied, intended, or required.

What is claimed is:

1. A vehicle, comprising:
at least two axles independently driven by respective electric machines each coupled to a separate battery; and
at least one controller configured to:
deliver power to one of the axles in a single axle drive mode, and
in response to a torque demand signal exceeding a single axle power limit, engage a multiple axle drive mode to deliver power to another axle.

2. The vehicle according to claim 1, further comprising:
the at least one controller further configured to:
in response to a braking signal,
adjust at least one of the electric machines (EMs), to capture mechanical braking energy from a respective axle, and
generate negative torque to charge at least one of the batteries.

3. The vehicle according to claim 1, further comprising:
a combustion engine (CE) coupled to one of the at least two axles; and
the at least one controller further configured to:
in response to the torque demand signal exceeding a multiple axle power limit, and a state of charge exceeding a charge sustain limit,
engage a charge deplete mode, and
deliver additional CE power to the coupled axle.

4. The vehicle according to claim 1, further comprising:
a combustion engine (CE) coupled to one of the at least two axles; and
the at least one controller further configured to:
in response to a state of charge signal decreasing to a charge sustain decreasing to a charge sustain limit,
engage a charge sustain mode, and
deliver CE power to the electric machine (EM) coupled to the one axle to generate electric power, to charge one or more of the batteries.

5. The vehicle according to claim 1, further comprising:
a combustion engine (CE) coupled to one of the at least two axles; and
the at least one controller further configured to:
in response to at least one of: (a) a state of charge signal decreasing to a charge sustain limit and (b) the torque demand signal exceeding combined power available from the batteries,
deliver CE power to: (a) propel the vehicle and meet the torque demand signal, and (b) the electric machine (EM) coupled to the one axle to generate electric power to charge one or more of the batteries.

6. The vehicle according to claim 1, further comprising:
a combustion engine (CE) coupled to one of the at least two axles; and
the at least one controller further configured to:
in response to a state of charge signal decreasing to a charge sustain limit for at least one of the batteries,
engage a charge sustain mode, and
deliver CE power to the electric machine (EM) coupled to the one axle to motivate one or more of the EMs to generate electric power and charge the at least one battery, such that the state of charge does not decrease.

7. The vehicle according to claim 1, further comprising:
the at least one controller configured to:
in response to a stability control signal, engage an all axle drive mode to deliver power to each of the at least two axles to increase traction of each wheel of each axle.

8. The vehicle according to claim 1, further comprising:
at least one battery configured in a charge sustain mode and to have an energy capacity of approximately one kilowatt-hour and an electric range of about 1 and 3 miles.

9. The vehicle according to claim 1, further comprising:
at least one battery configured to operate in charge sustain and depletion modes, and to have an energy capacity of approximately between 2 and 10 kilowatt-hours and an electric range of about between 2 and 49 miles.

10. The vehicle according to claim 1, further comprising:
at least one battery configured in a charge depletion mode and to have an energy capacity of approximately exceeding 10 kilowatt-hours and an electric range exceeding about 50 miles.

11. A vehicle, comprising:
at least two axles independently driven by respective electric machines each coupled to a separate battery;
a combustion engine (CE) coupled to one of the axles; and
at least one controller configured to:
deliver power to one of the axles in a single axle drive mode, and
in response to a torque demand signal exceeding a single axle power limit, to deliver power to another axle.

12. The vehicle according to claim 11, further comprising:
the at least one controller further configured to:
in response to the torque demand signal exceeding a multiple axle power limit, and a state of charge exceeding a charge sustain limit,
engage a charge deplete mode, and
deliver additional CE power to the coupled axle.

13. The vehicle according to claim 11, further comprising:
the at least one controller further configured to:
in response to a braking signal,
adjust at least one of the electric machines (EMs), to capture mechanical braking energy from a respective axle, and generate negative torque to charge the coupled separate battery.

14. The vehicle according to claim 11, further comprising:
the at least one controller further configured to:
in response to a state of charge signal decreasing to a charge sustain decreasing to a charge sustain limit,
engage a charge sustain mode, and
deliver CE power to the electric machine (EM) coupled to the one axle to generate electric power to charge one or more of the batteries.

15. The vehicle according to claim 11, further comprising:
the at least one controller further configured to:
in response to at least one of:
(a) a state of charge signal decreasing to a charge sustain decreasing to a charge sustain limit, and
(b) the torque demand signal exceeding combined power available from the batteries,
deliver CE power to: (a) propel the vehicle and meet the torque demand signal, and (b) the electric machine (EM) coupled to the one axle to generate electric power to charge one or more of the batteries.

16. A method of controlling a vehicle, comprising:
by at least one controller,
coupled with at least two axles independently driven by respective electric machines each coupled to a separate battery; and a combustion engine (CE) coupled to one of the axles;
delivering power to one of the axles in a single axle drive mode, and
in response to a torque demand signal exceeding a single axle power limit, delivering power to another axle.

17. The method of controlling a vehicle according to claim 16, further comprising:
by the at least one controller, in response to the torque demand signal exceeding a multiple axle power limit, and a state of charge exceeding a charge sustain limit,
engaging a charge deplete mode, and
delivering additional CE power to the coupled axle.

18. The method of controlling a vehicle according to claim 16, further comprising:
by the at least one controller, in response to a braking signal,
adjusting at least one of the electric machines (EMs), to capture mechanical braking energy from a respective axle, and to generate negative torque by the at least one EM to charge the coupled separate battery.

19. The method of controlling a vehicle according to claim 16, further comprising:
by the at least one controller, in response to a state of charge signal decreasing to a charge sustain decreasing to a charge sustain limit,
engaging a charge sustain mode, and
delivering CE power to the electric machine (EM) coupled to the one axle to generate electric power to charge one or more of the batteries.

20. The method of controlling a vehicle according to claim 16, further comprising:
by the at least one controller, in response to at least one of:
(a) a state of charge signal decreasing to a charge sustain decreasing to a charge sustain limit, and
(b) the torque demand signal exceeding combined power available from the batteries,
engaging a charge sustain mode, and
delivering CE power to: (a) propel the vehicle and meet the torque demand signal, and (b) the electric machine (EM) coupled to the one axle to generate electric power to charge one or more of the batteries.

* * * * *